(12) United States Patent
Erlingsson

(10) Patent No.: US 11,231,130 B2
(45) Date of Patent: Jan. 25, 2022

(54) WEDGE CLIP

(71) Applicant: Roxtec AB, Karlskrona (SE)

(72) Inventor: Oskar Erlingsson, Karlskrona (SE)

(73) Assignee: Roxtec AB, Karlskrona (SE)

( * ) Notice: Subject to any disclaimer, the term of this patent is extended or adjusted under 35 U.S.C. 154(b) by 0 days.

(21) Appl. No.: 16/275,017

(22) Filed: Feb. 13, 2019

(65) Prior Publication Data

US 2020/0256484 A1  Aug. 13, 2020

(51) Int. Cl.
*F16L 5/08* (2006.01)
*H02G 3/04* (2006.01)
*H02G 3/22* (2006.01)

(52) U.S. Cl.
CPC .............. *F16L 5/08* (2013.01); *H02G 3/0456* (2013.01); *H02G 3/22* (2013.01)

(58) Field of Classification Search
CPC ... F16L 5/08; F16L 3/233; F16L 3/237; F16L 3/137; F16L 3/1233; F16L 3/1008; F16L 3/1033; F16L 3/1075; F16L 3/1083; F16L 3/1091; F16L 3/10; F16L 3/08; F16L 5/02; F16L 3/23; F16L 3/1058; H02G 3/0456; H02G 3/22; G01M 3/18; F16M 3/1075
USPC ................................. 248/68.1, 74.3
See application file for complete search history.

(56) References Cited

U.S. PATENT DOCUMENTS

| | | | | |
|---|---|---|---|---|
| 1,274,427 A | * | 8/1918 | Ladnmann | B60R 25/005 70/200 |
| 1,519,018 A | * | 12/1924 | Boudreau | F16L 3/003 285/124.2 |
| 2,452,406 A | * | 10/1948 | Volkery | A01K 75/04 403/391 |
| 2,497,797 A | * | 2/1950 | Rogers | E05B 73/007 114/363 |
| 3,568,264 A | * | 3/1971 | Crist | E04G 7/08 294/87.1 |
| 3,906,592 A | * | 9/1975 | Sakasegawa | F16L 3/13 248/68.1 |
| 3,934,436 A | * | 1/1976 | Candlin | B62H 3/00 70/234 |
| 3,970,196 A | * | 7/1976 | Legge | B60R 9/10 211/5 |

(Continued)

FOREIGN PATENT DOCUMENTS

| | | |
|---|---|---|
| DE | 19602760 A1 | 7/1997 |
| WO | WO 2007/097706 A1 | 8/2007 |
| WO | 2018208215 A1 | 11/2018 |

OTHER PUBLICATIONS

International Search Report for International Application No. PCT/SE2020/050151 dated Mar. 20, 2020 (12 pages).

*Primary Examiner* — Christopher Garft
(74) *Attorney, Agent, or Firm* — Merchant & Gould P.C.

(57) ABSTRACT

A wedge clip (13) to be used to control the compression of a compression unit. The compression unit is part of a transition for cable or pipes. The transition further comprises a frame (1) and modules (3) placed inside the frame (1), whereby also the compression unit is placed inside the frame (1). The compression force is increased by turning two screws (5) of the compression unit outwardly and a distance between heads of the two screws (5). The compression unit as such is an indication of the applied compression force. The wedge clip (13) is adapted for use on said compression unit. The wedge clip (13) is formed of an elongated plate (14) bent over itself.

6 Claims, 2 Drawing Sheets

(56) References Cited

U.S. PATENT DOCUMENTS

| | | | | |
|---|---|---|---|---|
| 4,089,087 | A | * | 5/1978 | Heitman ............... F16L 3/2235 24/329 |
| 5,070,712 | A | * | 12/1991 | Fox ....................... E05B 67/003 70/18 |
| H1012 | H | * | 1/1992 | Senatro ........................ 248/68.1 |
| 5,115,542 | A | * | 5/1992 | Gehres ................ F16L 3/2235 24/339 |
| 5,193,366 | A | * | 3/1993 | Brinkman ............... E05B 73/00 70/178 |
| 5,234,185 | A | * | 8/1993 | Hoffman ............ B60H 1/00571 248/56 |
| 5,638,706 | A | * | 6/1997 | Stevens ..................... B60R 9/10 224/520 |
| 5,746,074 | A | * | 5/1998 | Collins ................ A01D 34/828 70/14 |
| 5,887,461 | A | * | 3/1999 | Heffley .................. E05B 71/00 70/18 |
| 6,018,968 | A | * | 2/2000 | Sides ...................... E05B 67/36 292/288 |
| 6,082,697 | A | * | 7/2000 | Grunfeld ............. A63B 63/004 248/156 |
| 6,092,402 | A | * | 7/2000 | Porcelli ............... A63C 11/005 70/18 |
| 6,158,095 | A | * | 12/2000 | Lassiter .................. F16L 3/237 24/129 R |
| 6,189,187 | B1 | * | 2/2001 | Williams ............... H01R 13/60 24/16 R |
| 6,668,644 | B2 | * | 12/2003 | Hall ........................ G01F 15/18 73/273 |
| D676,314 | S | * | 2/2013 | Cude ............................ D8/396 |
| 2010/0175271 | A1 | | 7/2010 | Lundborg |

* cited by examiner

WEDGE CLIP

TECHNICAL FIELD

The present invention relates generally to a wedge clip, to be used with a compression unit, in the form of a wedge, of a frame for cable entries, cable transits or pipe penetrations.

PRIOR ART

A common transit for cables or pipes that are to go through some kind of partition, comprises a frame fixed in an opening of the partition, for instance by means of welding. Inside the frame a number of compressible modules are received, which modules are designed to receive one cable or pipe each. To keep the modules inside the frame stay plates may be placed between rows of modules. Further, some kind of compression unit is placed inside the frame in order to compress the modules and thereby seal the transit. One example of a compression unit is referred to as an wedge and has a number of wedge elements that are made to move relative to each other by means of screws. The position of the screw heads of the screws can be used as an indication of the compressing force applied by the compression unit.

From WO 2007/097706 it is known to use a compression indicator to control that a correct compression of a compressing unit has been applied.

SUMMARY

In some installations it is a need to hinder that a compression unit is tampered with after controlling that a correct compressing force has been applied. Further, there may also be a need to mark in some way that a compression unit has been checked after installation.

These objects are meet by means of a wedge clip according to claim 1. In the dependent claims further features of the wedge clip are stated.

Further objects and advantages of the present invention will be obvious to a person skilled in art when reading the detailed description below of different embodiments.

BRIEF DESCRIPTION OF THE DRAWINGS

The present invention will be described below by way of examples and with reference to enclosed drawings. In the drawings.

DETAILED DESCRIPTION OF EMBODIMENTS

Figure 1:
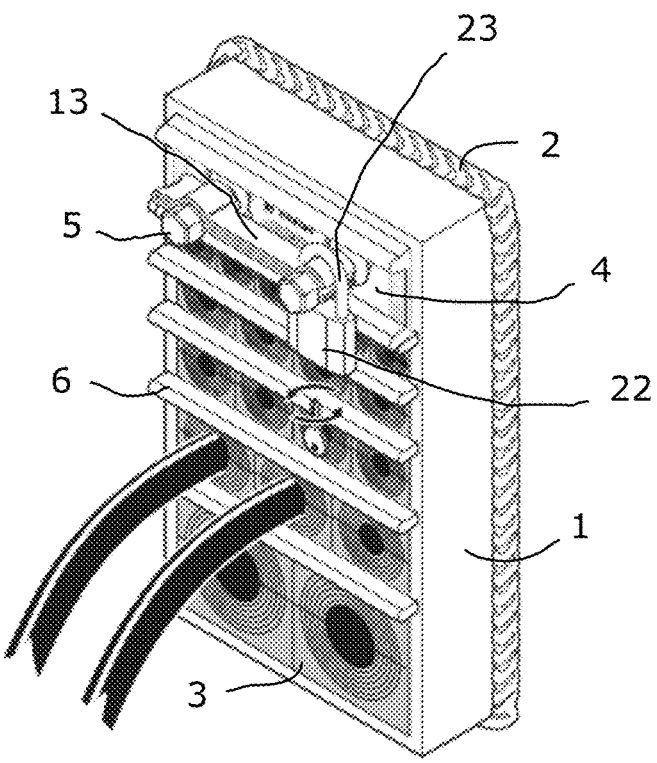
FIG. 1 is a perspective view of a transition, in which a wedge clip according to the present invention is placed.

In the example of FIG. 1 a frame 1 is shown, which frame 1 is intended to be received in an opening of a wall, a roof, a floor or a bottom of a house, a ship, an electrical cabinet, a container etc. The wall, roof, floor or bottom could be expressed as any dividing structure or partition. To simplify the term "partition" will be used in this description as a general term for the different parts in which the frame 1 may be placed. The frame 1 is often connected to the partition by means of a weld 2, as indicated in FIG. 1.

Figure 2:
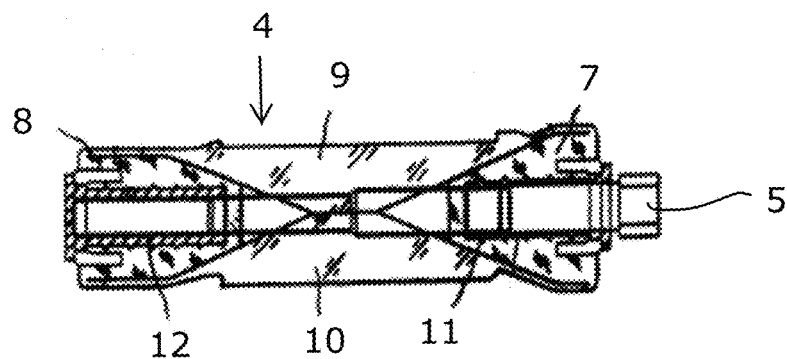
FIG. 2 is a side view of a wedge of the transition of FIG. 1 in a first operating state.
Figure 3:
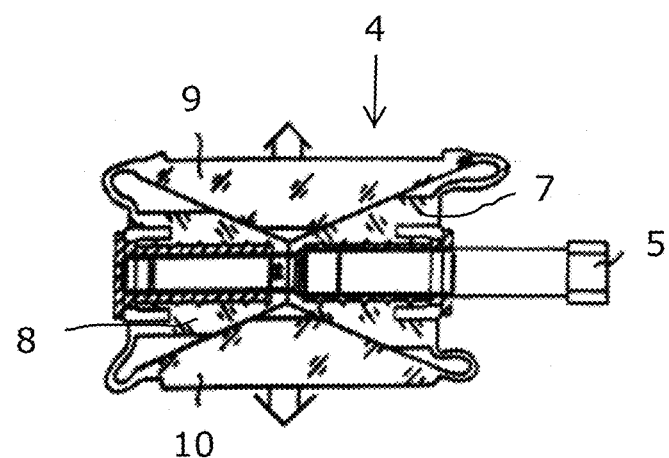
FIG. 3 is a side view of a wedge of the transition of FIG. 1 in a second operating state.
Figure 4:
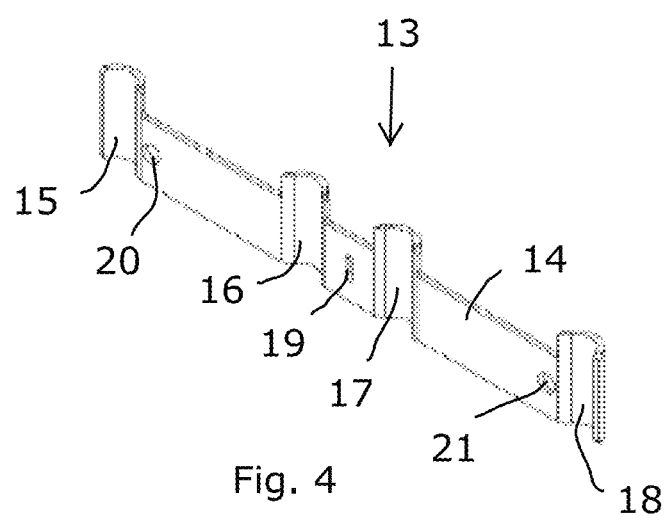
FIG. 4 is a perspective view of an elongated plate of which the wedge clip is formed.

Inside the frame 1 a number of compressible modules 3 are placed. In each such module 3 a cable or pipe may be received. In the shown embodiment the modules 3 are furnished with a number of peelable layers, which layers are peeled off to adapt the inner diameter of a module 3 to the outer diameter of the cable or pipe to be received inside the module 3. Stay plates 6 are placed between rows of modules 3 inside the frame 1. Furthermore, a compression unit, here in the form of a wedge 4 is placed inside the frame 1. The wedge 4 comprises two screws 5 by means of which the wedge 4 is moveable between a compressing state and a non-compressing state, as indicated in FIGS. 2 and 3, respectively. In the compressing state of the wedge 4 the modules 3 inside the frame 1 will be compressed, whereby the modules 3 will be pressed against the cable or pipe received inside the module 3 and seal against the cable or pipe.

The wedge 4 comprises a first wedge element 7 and a second wedge element 8, which can be moved towards and away from each other by means of the screws 5. The wedge 4 further comprises a third wedge element 9 and a fourth wedge element 10, which third and fourth wedge elements 9, 10 will be moved towards and away from each other in co-action with the first and second wedge elements 7, 8.

The screws 5 are received in first sockets 11 and second sockets 12. The first sockets 11 are received in the first wedge element 7, one socket 11 for each screw 5, and the second sockets 12 are received in the second wedge element 8, one socket 12 for each screw 5. The sockets 11, 12 are either loose parts inserted and fixed in the first and second wedge elements 7, 8, respectively, or are integrated in the first and second wedges 7, 8, respectively, i.e. made in one piece with respective first and second wedge elements 7, 8. Each screw 5 has a first thread, co-acting with a thread of one of the first and second sockets 11, 12, and a second thread co-acting with a thread of the other of the first and second sockets 11, 12. One of said threads of each screw 5 is a right-hand thread and the other is a left-hand thread. Thus, depending on the direction of rotation of the screws 5, the first and second wedge elements 7, 8 will move towards each other or away from each other.

The first wedge element 7 is in contact with the third and fourth wedge elements 9, 10 along inclined surfaces. The second wedge element 8 is also in contact with the third and fourth wedge elements 9, 10 along inclined surfaces. The inclinations of said surfaces are such that the third and fourth wedge elements 9, 10 will move away from each other when the first and second wedge elements 7, 8 are moving toward each other. When the first and second wedge elements 7, 8 are moving away from each other the third and fourth wedge element 9, 10 will be moved toward each other.

In use the first and second wedge elements 7, 8 move axially along the screws 5, while the third and fourth wedge elements 9, 10 move radially towards and away from the screws 5.

The wedge 4 moves towards the compressing state, the further the screws 5 are screwed out of the wedge 4. In order to have a sufficient compression the distance between the head of each screw 5 and the wedge 4, i.e. the first wedge element 7 in the shown embodiment, should have a certain size, which may vary depending on the actual installation. To control that a correct minimal compression has been reached a wedge clip 13, having a predetermined width, is to be placed on the screws 5 between the heads of the screws 5 and the wedge 4. Thus, if the distance between the heads of the screws 5 and the wedge 4 is too small for receiving the wedge clip 13, a predetermined compression has not been reached. In such a case, the screws 5 are to be turned further outwards until the wedge clip 13 can be received.

The wedge clip 13 has the form of an elongated plate 14, which is to be bent over itself in use. The wedge clip 13 has a first semi-cylindrical recess 15, a second semi-cylindrical recess 16, a third semi-cylindrical recess 17 and a fourth semi-cylindrical recess 18. The first and fourth recesses 15, 18 are placed at opposite ends of the elongated plate 14. The second and third recesses 16, 17 are placed on opposite sides of an oblong opening 19, which oblong opening 19 is a through opening placed in the centre of the elongated plate 14. Further, the elongated plate 14 has a first circular opening 20 and a second circular opening 21. Said first and second circular openings 20, 21 are through openings and are placed adjacent the first recess 15 and the fourth recess 18, respectively.

In use the wedge clip 13 is formed in that the elongated plate 14 is bent over at the oblong opening 19. The recesses 15-18 of the elongate plate 14 are placed in such positions, that when the elongated plate 14 has been turned over itself, the first semi-cylindrical recess 15 and the fourth semi-cylindrical recess 18 are placed on top of each other at the same time as the second semi-cylindrical recess 16 and the third semi-cylindrical recess 17 are placed on top of each other. Thus, the wedge clip 13 will have two cylindrical recesses. Said cylindrical recesses are placed at the same distance from each other as the screws 5 of the wedge 4 are placed from each other. In use each cylindrical recesses of the clip is to be placed surrounding a stem of one of the screws 5 of the wedge 4.

The first and second circular openings 20, 21 of the elongated plate 14 are placed in such positions that they will be placed above each other when the wedge clip 13 is formed. Thus, the wedge clip 13 will have a circular through opening adjacent the cylindrical recess formed of the first and fourth semi-cylindrical recesses 15, 18 of the elongated plate 14. The wedge clip 13 can be locked in position on the screws 5 of the wedge 4 by means of a padlock 22, whereby the shackle 23 of the padlock 22 is placed in the formed through opening of the wedge clip 13.

The padlock 22 may be used by a supervisor to indicate that the wedge 4 has been tightened in a correct way. Further, the padlock 22 will hinder tampering of screws 5 of the wedge 4 in an untightening direction, that goes beyond a predetermined minimal compression.

The invention claimed is:

1. A combination compression unit and wedge clip to be used to control compression of the compression unit, the combination comprising:
    (a) the compression unit is part of a transition for cables or pipes, the transition further comprises a frame and modules placed inside the frame, the compression unit is placed inside the frame, and a compression force is increased by turning two screws of the compression unit outwardly and a distance between heads of the two screws and the compression unit as such is an indication of the compression force;
    (b) the wedge clip is adapted for use on said compression unit and the wedge clip is formed of an elongated plate bent over itself and located on the two screws of the compression unit between the heads of the two screws and the compression unit,
        (i) the elongated plate has first, second, third and fourth semi-cylindrical recesses, the first and fourth semi-cylindrical recesses are placed on top of each other and the second and third semi-cylindrical recesses are place on top of each other when the elongated plate is bent over itself and located on the two screws, and
        (ii) the elongated plate has a first through opening placed between the first and second semi-cylindrical recesses, and a second through opening placed between the third and fourth semi-cylindrical recesses thereby forming a through opening of the wedge clip when the wedge clip is located on the two screws; and
    (c) a padlock having a shackle, wherein the shackle of the padlock extends over and around one of the two screws and through the through opening of the wedge clip, and the padlock and the shackle hinder tampering of the two screws of the compression unit.

2. The wedge clip of claim 1, wherein the elongated plate has a through oblong opening placed in a center of the elongated plate and at which oblong opening the elongate plate is bent in forming of the wedge clip.

3. The wedge clip of claim 2, wherein the first and fourth semi-cylindrical recesses are placed at opposite ends of the elongated plate and wherein the second and third semi-cylindrical recesses are placed adjacent the oblong opening in the center of the elongated plate.

4. The wedge clip of claim 3, wherein the first and fourth semi-cylindrical recesses are placed on top of each other when the elongated plate has been turned over to form the wedge clip and wherein the second and third semi-cylindrical recesses are placed on top of each other when the elongated plate has been turned over to form the wedge clip.

5. The wedge clip of claim 4, wherein distances between the semi-cylindrical recesses are adapted to distance between the screws of the compression unit in such a way that the first and fourth semi-cylindrical recesses are positioned to be placed over a stem of one of the two screws of the compression unit and the second and third semi-cylindrical recesses are positioned to be placed over a stem of the other of the two screws of the compression unit when the elongated plate is turned over itself to form the wedge clip.

6. The wedge clip of claim 1, wherein the first and second through openings are circular openings.

\* \* \* \* \*